Feb. 16, 1926.                                                      1,573,572
                              F. W. REES
                    WHEEL PULLER FOR MOTOR VEHICLES
                     Filed August 14, 1924        2 Sheets-Sheet 1
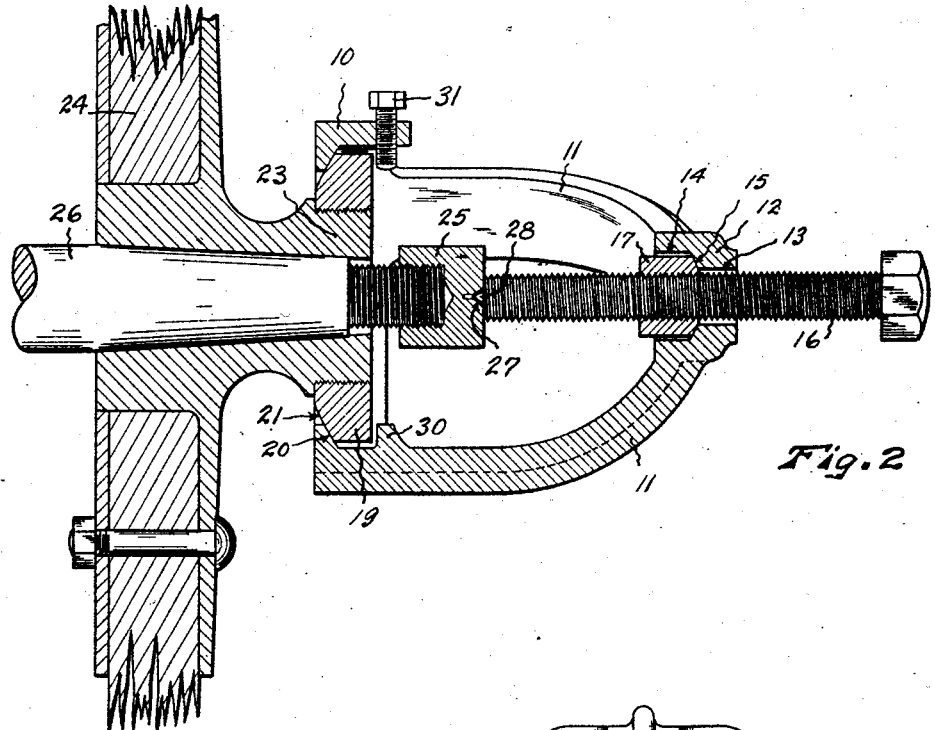
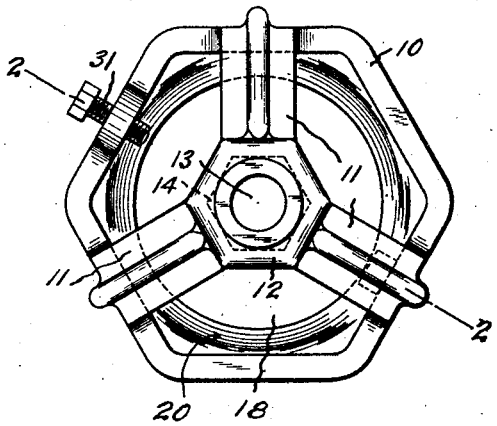
INVENTOR
Frank W. Rees
BY
Fred C. Matheny
ATTORNEY

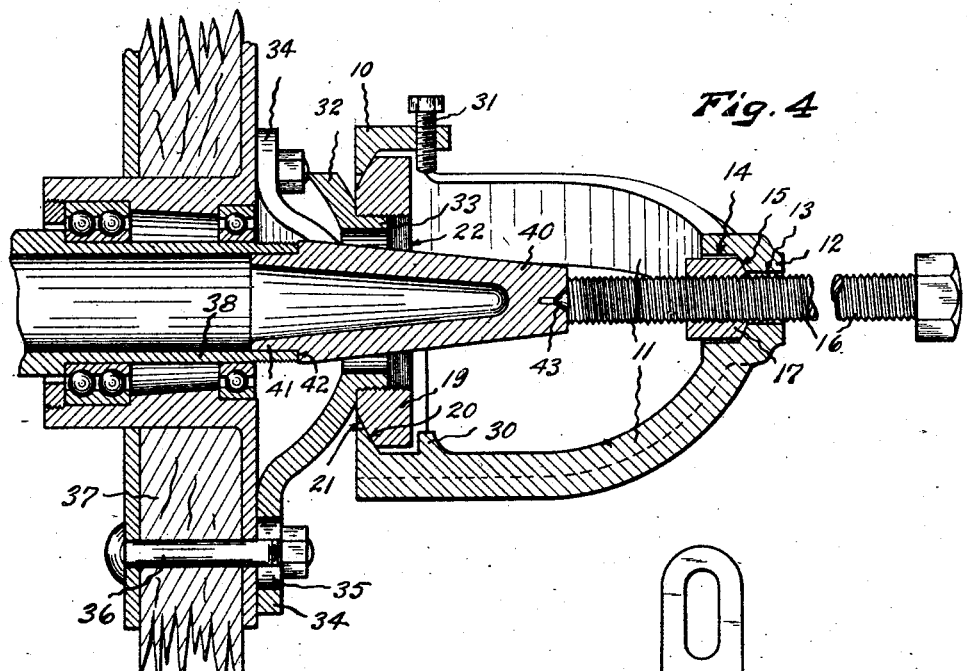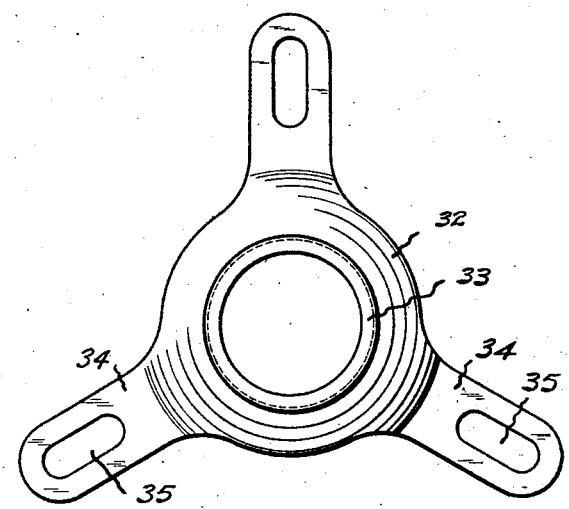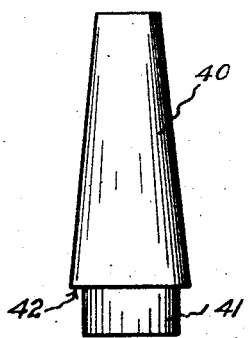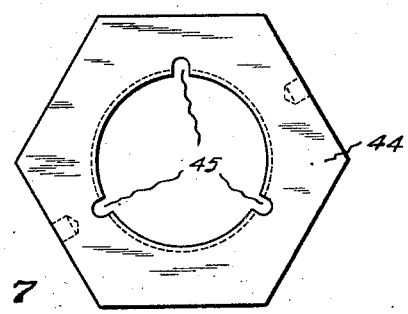

Patented Feb. 16, 1926.

1,573,572

UNITED STATES PATENT OFFICE.

FRANK W. REES, OF OLYMPIA, WASHINGTON, ASSIGNOR TO SUPERIOR TOOL COMPANY, INC., OF OLYMPIA, WASHINGTON, A CORPORATION OF WASHINGTON.

WHEEL PULLER FOR MOTOR VEHICLES.

Application filed August 14, 1924. Serial No. 731,907.

*To all whom it may concern:*

Be it known that I, FRANK W. REES, a citizen of the United States, and a resident of Olympia, in the county of Thurston and State of Washington, have invented certain new and useful Improvements in Wheel Pullers for Motor Vehicles, of which the following is a specification.

My invention relates to improvements in wheel pullers and the object of my improvement is to provide a wheel puller of strong, simple and inexpensive construction that may be used for removing the wheels of motor vehicles.

Another object is to provide a wheel puller of this nature that is applicable to wheels of various types and that may be used in connection with semifloating or full floating axles and that may be applied to disc wheels of the usual types.

Another object is to provide a wheel puller that is self adjusting in such a manner as to prevent undue binding of the wheel on the axle, the nut that is fastened to the wheel being free within a limited movement to automatically find its own adjustment relative to the wheel puller frame when a pull is exerted on the frame in removing a wheel.

Another object is to provide a wheel puller having a thrust screw floatingly mounted in the frame whereby it may be quickly adjusted to the wheel and whereby it will cooperate with the adjustably mounted nut in finding its normal position and will tend to eliminate undue and unnatural strains.

A further object is to provide, in connection with a wheel puller of this type, a special nut for use as a cap to protect the end of an axle on which a thrust is being exerted, and to further provide a bracket for securing the frame to a wheel that has no externally threaded hub on which a pull may be exerted, and, to provide a separate thrust member for use in connection with a wheel that is carried on a full floating axle.

Other and more specific objects will be apparent from the following description taken in connection with the accompanying drawings.

In the drawings Figure 1 is an end view of a wheel puller constructed in accordance with my invention.

Fig. 2, is a sectional view of the same substantially on broken line 2—2 of Fig. 1, showing the wheel puller applied to a wheel.

Fig. 3, is a sectional view through a nut, hereinafter termed an adapter nut, showing the curvature of the bearing surface of said nut.

Fig. 4, is a sectional view illustrating the use of a bracket for securing the wheel puller to a wheel and further illustrating the use of a thrust member on a full floating axle.

Fig. 5, is a plan view of a bracket.

Fig. 6, is a detached view in elevation of the thrust member used on full floating axles.

Fig. 7, is a plan view of a modified form of adapter nut which may be used for cleaning out or re-cutting a damaged thread on a wheel hub.

Referring to the drawings, throughout which like reference numerals designate like parts, I show a wheel puller embodying an integral frame or bracket casting consisting of a base, 10 preferably hexagonal, that is connected with three integral bracket arms 11 that terminate in a concentrically arranged hub 12. The hub 12, is provided with a bore 13, having at its bottom end a larger countersunk portion 14 of hexagonal shape, preferably provided with a rounded upper end 15. A thrust screw 16 of smaller diameter than the bore 13 passes loosely therethrough and has a nut 17 threaded thereon which, preferably, is provided with a rounded upper end and is arranged to fit somewhat loosely into the countersunk recess 14 thereby leaving the thrust screw 16 free to tilt sidewise a limited amount in any direction so that it will not bind or tend to make a wheel bind more tightly on its axle.

The central portion of the base 10 is removed leaving a relatively large opening 18, and said base 10 is arranged for the reception of an adapter nut 19, preferably of hexagonal shape. The bottom of the recess in the base 10 wherein the adapter nut 19 is disposed is preferably rounded as at 20, and the bottom side of the nut is similarly rounded on the same radius as at 21 so that any force acting to pull the nut 19 against the base will tend to position the nut correctly in the base thereby eliminating side strain. The adapter nut 19 has a centrally arranged threaded opening 22 adapted to screw over the hub 23 of a vehicle wheel 24 as shown in Fig. 2 or to screw onto a special bracket that may be fastened to a vehicle wheel all as hereinafter described. Different adapter nuts may be provided for standard hubs of different size, all of said adapter nuts being the same size externally to fit within the base portion of the same wheel puller frame.

25 is an axle cap or nut that screws over the threaded end of an axle 26 to protect the same and that has a centrally located recess 27 for the reception of a centrally disposed point 28 on the end of the thrust screw 16.

The adapter nut is loosely held in place in frame base 10 by an integral lug 30 on one side of said base and a screw 31 on the opposite side of said base.

In operation, when a wheel 24 is to be removed from an axle 26 the usual hub cap and axle nut, not shown, are first removed, the cap nut 25 is placed on the end of the axle to prevent damage to the threads thereon and the adapter nut, which has previously been placed in the frame 10 is screwed over the hub 23. The thrust screw 16 is then centered on the axle cap 25 and tightened against the same, thereby exerting a thrust on axle 26 and a pull on the hub 23 of wheel 24 that will pull the wheel off of the axle.

The adapter nut 19, being held loosely in the base frame 10 and having a spherical bearing surface against which the pull is exerted permits the frame to automatically adjust itself relative to the nut and assume the correct alignment relative to the axle and wheel bearing so that a straight pull will always be exerted on the wheel and no unnecessary binding of the wheel on the axle will be produced. The thrust screw 16 has enough play so that it will automatically assume the correct alignment relative to the other parts.

The thrust screw being floatingly disposed and free to move through the hub 12 facilitates the handling and adjustment of the device to a wheel, obviates the necessity of threading the hub directly, makes possible the easy removal and replacement of the threaded part or nut 17 if it should become worn and leaves the thrust screw free and unrestrained, within certain limits, to find its own adjustment. The thrust screw 16 is capable of exerting a powerful thrust, and the frame and all other parts, preferably being constructed of steel, are capable of withstanding sufficient strain to remove any ordinary motor vehicle wheel from its axle.

Fig. 4, shows this wheel puller as applied to a wheel carried on a full floating axle and in which it is necessary to remove the wheel hub and driving axle proper before access can be had to the bearing parts for removing the wheel. In attaching the device to a wheel of this type I use a bracket 32 having an externally threaded hub 33, arranged to screw into the adapter nut 19 and having three equidistantly spaced curved radial arms 34, provided near their outer ends with slots 35 through which hub bolts 36 in the hub portion of a wheel 37 may be passed to secure the bracket to the wheel.

In the full floating axle type of wheels it is also necessary that the thrust be exerted against an axle housing 38 on which the wheel is mounted at the same time the pull is exerted on the wheel and to take care of this thrust I provide a thrust member 40, having a smaller end 41 that is adapted to enter the axle housing 38 and that affords a shoulder 42 that abuts against the end of such axle housing 38. The outer end of the thrust member 40 has a central recess 43 for the reception of the point on the end of thrust screw 16. Thrust members 40 of different size may be provided where the axle housings so require.

In the use of the bracket 32 the same is secured to the wheel hub by removing the nuts from the usual hub bolts 36, placing the bracket thereon and then replacing the nuts, the slots 35 affording sufficient adjustment to take care of variations in the locations of the hub bolts on all ordinary types of wheels. After the bracket 32 is made fast to the wheel, the hub 33 of such bracket may be screwed into the adapter nut 19, the thrust member 40 may be adjusted to the axle housing 38, and the thrust screw 16 may be tightened against the same, thereby drawing the wheel off of the axle housing.

If the form of wheel and bearing so require or admit, the bracket 32 may be used without the thrust member 40, or the thrust member 40 may be used without the bracket 32.

The adapter nut 19 and thrust screw 15 are self adjusting in exactly the same manner when used in connection with bracket 32 and thrust member 40 as when used as shown in Fig. 2.

In Fig. 7 I have shown an adapter nut 44 which is similar to the adapter nut 19 in every way except that the internal threads thereof are removed as at 45 at a plurality of points to afford cutting edges so that this nut may be used as a die to clean out or re-cut the threads of a hub in case such threads have been injured in any way.

I have shown and described my device as adapted for use as a wheel puller, but it will be understood that the same may be put to various other uses, as for instance it may be used in pulling gearwheels or bearings off of shafts.

The foregoing description and accompanying drawings clearly disclose a preferred embodiment of my invention but it will be understood that numerous changes in the same may be resorted to within the scope of the following claims.

I claim:

1. In a device of the class described, a frame, having a spherical bearing surface formed therein, a thrust screw operatively disposed in said frame, and an adapter nut arranged to be secured to an object on which a pull is to be exerted and having a spherical bearing surface arranged to fit the spherical bearing surface in said frame.

2. In a wheel puller of the class described, a frame having a concentrically arranged perforated hub that is provided on its bottom side with a nut receiving recess, a thrust screw slidable through said hub, a nut on said thrust screw arranged to fit within said nut receiving recess and a removable adapter nut supported for limited universal adjustment in said frame and arranged to be secured to a wheel.

3. In a wheel puller for use on a motor vehicle wheel, a frame, a thrust screw in said frame, an adapter nut supported for automatic adjustment in said frame and a bracket arranged to be secured to the adapter nut and to the bolts in a wheel hub.

FRANK W. REES.